United States Patent
Babcock et al.

(10) Patent No.: US 6,581,620 B2
(45) Date of Patent: Jun. 24, 2003

(54) METHOD AND APPARATUS FOR REPAIRING OR REPLACING VALVES

(76) Inventors: Dennis Babcock, 1155 First St., Phillipsburg, KS (US) 67661; Randal Lyon, 211 County Rd., Phillipsburg, KS (US) 67661

(*) Notice: Subject to any disclaimer, the term of this patent is extended or adjusted under 35 U.S.C. 154(b) by 0 days.

(21) Appl. No.: 09/814,234

(22) Filed: Mar. 21, 2001

(65) Prior Publication Data

US 2002/0134430 A1 Sep. 26, 2002

(51) Int. Cl.[7] ............................................. F16K 43/00
(52) U.S. Cl. ........................ 137/15.15; 137/15.17; 137/15.18; 138/93; 138/94; 138/97
(58) Field of Search ...................... 137/15.08, 15.15, 137/15.17, 15.18, 315.01, 315.41, 315.42, 15.14, 317; 138/89, 90, 93, 94, 97

(56) References Cited

U.S. PATENT DOCUMENTS

| | | | | |
|---|---|---|---|---|
| 2,309,429 A | * | 1/1943 | Ahern | 138/93 |
| 2,763,282 A | * | 9/1956 | Reedy et al. | 137/318 |
| 2,811,895 A | * | 11/1957 | Wells | 138/93 |
| 3,842,864 A | * | 10/1974 | Riegel et al | 138/94 |
| 4,127,141 A | * | 11/1978 | Ledonne et al. | 137/318 |
| 4,239,055 A | * | 12/1980 | Van Coffman | 138/94 |
| 4,398,565 A | * | 8/1983 | Williamson | 138/93 |
| 4,804,018 A | * | 2/1989 | Carr et al. | 138/97 |
| 5,076,328 A | * | 12/1991 | Lyon | 138/93 |
| 5,099,868 A | * | 3/1992 | Weber | 138/94 |
| 5,357,763 A | * | 10/1994 | Vogel | 138/93 |
| 5,894,863 A | * | 4/1999 | Lewis et al. | 138/97 |
| 5,967,191 A | * | 10/1999 | Mummolo | 137/318 |
| 6,263,896 B1 | * | 7/2001 | Williams | 138/94 |

FOREIGN PATENT DOCUMENTS

DE 182332 * 3/1907 .................. 138/93

* cited by examiner

Primary Examiner—George L. Watson
(74) Attorney, Agent, or Firm—Kenneth H. Jack; Davis & Jack, LLC

(57) ABSTRACT

A method and apparatus for repairing a valve, the valve being attached to a tank, the method including steps of providing a valve tool having a rigid tube and having an elastic air bladder, such bladder having a port, the port being connected to the tube, the valve tool further having a check valve; opening the valve in need of repair; extending the valve tool into such valve; injecting air into the rigid tube, causing the bladder to seal against the tank; detaching and withdrawing such valve; repairing such valve; reattaching such valve; opening the check valve to break the seal; and withdrawing the valve tool.

2 Claims, 4 Drawing Sheets

METHOD AND APPARATUS FOR REPAIRING OR REPLACING VALVES

FIELD OF THE INVENTION

This invention relates to valves. More particularly, this invention relates to apparatus and processes for repairing or replacing gate valves, quarter turn ball valves, quarter turn cylindrical plug valves, butterfly valves, and full bore diaphragm valves.

BACKGROUND OF THE INVENTION

Through passage of time and extended usage seatings of closing members of gate valves, ball valves, cylindrical plug valves, butterfly valves, and full bore diaphragm valves tend to degrade, become obstructed by debris, or misalign. Also, through time and use, valve actuator seals and bearings tend to wear and degrade. Where such undesirable degrading of valve components occurs, the valve must be removed and replaced, or removed and disassembled for maintenance. Where such a valve controls fluid flow emanating from a fluid bearing tank or pipe, removal of the valve is commonly achieved by initially purging fluid upstream of the valve. Yet, in many instances, the volume of fluid contained upstream is too great to conveniently purge. Oil storage tanks commonly pose such a problem. The problem also arises where the upstream fluid is borne by a pipeline under pressure. The volume of upstream fluid may be limitless where the valve in need of repair controls pipeline flow.

The instant inventive apparatus and method advantageously eliminates the valve repair step of purging upstream fluid by providing a novel and inventive plugging tool adapted for extension upstream through the bore of the valve to be repaired or replaced, and by providing novel method and process steps directed to utilization of such tool.

BRIEF SUMMARY OF THE INVENTION

A major structural element of the inventive tool utilized in the present inventive method, comprises a rigid tube having a rearward end, a forward end, and a hollow bore extending from the rearward end to the forward end. The dimensions of valves upon which the inventive tool is to be used determines a minimum length for such rigid tube. For example, where the inventive tool is to be utilized upon a valve having an eighteen inch bore, the rigid tube would need to be at least eighteen inches long. However, upon full insertion of the tool through the bore of a valve, it is preferred that one foot to eighteen inches of tube length remain protruding rearwardly from the downstream end of the valve; such protrusion providing contact surfaces for firm, two handed grasping of the tube. Preferably, the outside diameter of the tube is approximately one inch, further facilitating firm manual grasping.

For strength and durability, the rigid tube may comprise a steel pipe. However, where volatile flammable fluids are present, the rigid tube may be composed of brass or PVC plastic, reducing spark ignition hazards.

A second major structural element of the inventive valve repair or replacement tool comprises an elastic air bladder having a port, the port being fixedly attached to the forward end of the rigid tube for communication of air between the hollow bore of the tube and the interior space of the bladder. The elastic bladder is preferably composed of vulcanized rubber or other suitable synthetic elastomere.

Preferably, the port of the elastic air bladder comprises an outwardly extending annular flange or collar whose inside diameter is closely fitted for slidable mounting over the forward end of the rigid tube. Such port configuration advantageously provides an outer annular surface for application of a compression band such as a common hose clamp, a crimp ring, a magniform ring, or a heat shrink ring. Such compression band attaching means secures the port upon the forward end of the rigid tube. Alternately, a spirally threaded metal fitting may be molded into the elastic air bladder as an integral part of its port. Such spirally threaded attaching means may threadedly engage with spiral threads cut into the forward end of the rigid tube. Further alternately, wire frapping may comprise the attaching means. Also alternately, the port may be adhesively bonded to the forward end of the rigid tube. Suitably, though less desirably, the linkage between the port and the rigid tube may comprise a simple friction joint.

A third major structural element of the present inventive valve tool comprises air flow control means operatively connected to the rigid tube. Necessarily, the air flow control means permits injection of air into the rearward end of the rigid tube for forward flow therethrough, the air emitting from the forward end of the rigid tube and inflating the elastic air bladder. The air flow control means must further function to alternately permit and resist rearward air flow within the rigid tube, allowing the elastic air bladder to remain in an inflated state until deflation is desired. A preferred air flow control means comprises a spring assisted check valve of the type commonly utilized upon pneumatic tires. Such check valve may be installed in axial alignment in line with the rearward end of the rigid tube; such installation avoiding expansion of the profile of such tube. Suitably and alternately, the air flow control means may comprise a manually openable and closeable quarter turn ball valve, plug valve, or butterfly valve. Where such a valve is utilized as the air flow control means, the valve is necessarily selected to have exterior dimensions small enough for passage through the bore of valves upon which the tool is used.

Where the air flow control means comprises a simple rearwardly extending check valve, air may be injected into such valve for inflation of the elastic air bladder by means of a common bicycle pump. However, it is difficult for a single operator to manipulate both the valve tool and a bicycle pump; and bicycle pumps inject air at an undesirably slow rate. The preferred source of compressed air is an air line extending from an air tank or extending from a reciprocating piston air compressor. Ideally, the distal end of such air line comprises quick attaching and detaching means such as a floating ball and sleeve coupling. Preferably, the rearward end of the rigid tube is sized and channeled for engagement with such coupling.

For enhancement of control of the valve tool and of air flow, it is also preferred that the distal end of such air line comprise a manually operable quarter turn ball valve or cylindrical plug valve. Utilization of such valve conveniently avoids causing the steps of attaching and detaching the coupling to occur simultaneously with steps of injecting air and interrupting air injection.

Preferably, the elastic air bladder is durable, having a blow out pressure greater than the air driving capacity of the air injection means. However, for purposes of additional safety, it is preferred that the distal end of such air line further comprise a pressure relief valve, such valve being adapted for diverting injected air to the outside atmosphere prior to inflation of the elastic air bladder to its blow out point.

The present inventive method of utilizing the inventive valve tool comprises an initial step of closing a gate valve, a ball valve, a cylindrical plug valve, a full bore diaphragm valve, or a butterfly valve. Upon closure of such valve, any structure attached to the downstream end of such valve such as a flexible hose, a rigid pipe, or a tank, is removed from such valve, exposing the downstream end of the bore of such valve.

The next sequential step of the inventive method comprises opening the valve. An occasion for utilization of the inventive tool and method arises where the upstream end of the valve is attached to a fluid bearing tank such as an oil tank, or to a fluid bearing pipe. Upon opening of the valve, such fluid begins to emit onto the ground; or preferably, into a catch basin provided by the operator.

The next immediate sequential step of the inventive method comprises insertion of the forward end of the valve tool into or through the bore of the valve. Necessarily, the outside diameters of the elastic air bladder in its deflated state, and the rigid tube are fitted for passage through such bore. The effective size of the bore being limited by any gate, ball, plug, diaphragm, or butterfly member extending into the bore.

The extent of forward extension of the valve tool into or through the valve is determined by the particular valve maintenance, repair, or replacement procedure which is to be performed. Where maintenance or repair is to be performed upon an actuator assembly of the valve, without removal of the valve from its upstream structure, the forward end of the valve tool may be sufficiently extended to a point where the elastic air bladder lies within the upstream end of the valves' bore. Upon such placement of the valve tool, air may be injected into the rearward end of the rigid tube, inflating the elastic air bladder and causing the bladder to seal against the inner surface of the upstream end of the valve. With such seal in place, the actuator assembly of the valve may be disassembled for repair or replacement of parts.

In many circumstances, the valve must be totally removed for performance of maintenance and repairs offsite, or for total valve replacement. Where total removal of the valve is necessary, the valve tool insertion step must continue until the elastic air bladder extends into the tank or pipe to which the upstream end of the valve is attached. Upon such positioning of the elastic air bladder, air is injected into the rearward end of the tube, causing the elastic air bladder to expand and seal against the output port of the tank to which valve is attached, or against the annular inner surface of the pipe to which the valve is attached. Such air bladder expansion creates a seal against the tank output port or pipe, as the case may be, allowing the valve to be detached, and rearwardly withdrawn over the valve tool. A newly repaired or replacement valve may then be forwardly extended over the valve tool, the forward end of the repaired or replaced valve being reattached to the tank or pipe, as the case may be.

Upon performance of repairs or replacement as described above, the air flow control means is manually operated to allow air to flow rearwardly from the elastic air bladder through the hollow bore of the rigid tube to emit from such bore's rearward end. Such rearward air flow deflates the elastic air bag, breaking the seal, and returns the elastic air bag to a dimension allowing rearward passage of the tool through the repaired or replaced valve. Upon such deflation and breaking of seal, the tool is quickly withdrawn, and the valve is closed. Fluid emitting from the valve between the time that the seal is broken and the time that the valve is closed is preferably collected in catch basin.

Accordingly, it is an object of the present invention to provide an apparatus and method for replacing valves which are attached to fluid bearing tanks or pipes.

It is a further object of the present invention to provide such an apparatus and method which eliminates the necessity of a step of purging fluid upstream of the valve prior to valve repair or replacement.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
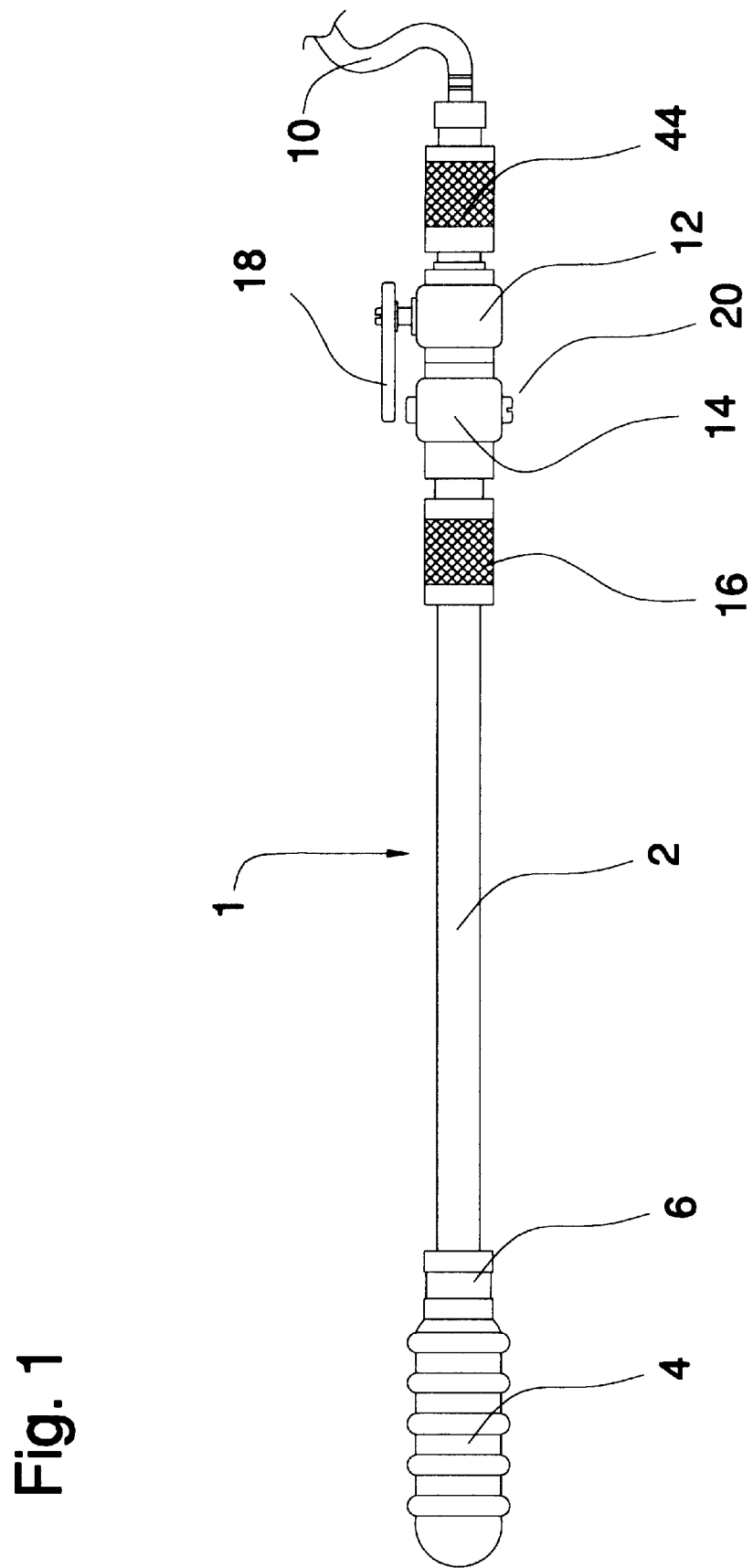
FIG. 1 is a side view of the inventive valve tool utilized in the present invention.

Referring now to the drawings, and in particular to FIG. 1, the valve tool of the instant invention is referred to generally by reference arrow 1. The valve tool 1 comprises a hollow bored rigid tube 2. For enhancement of durability, it is preferred that the rigid tube 2 be composed of steel. Suitably, the rigid tube 2 may be composed of brass, or PVC plastic for reduction of spark ignition hazards.

Referring further to FIG. 1, at the forward end of the rigid tube 2 is installed an elastic air bladder 4. Preferably, the elastic air bladder 4 is composed of vulcanized rubber or some other suitable elastomere. Preferably, the rearward end of the elastic air bladder 4 forms a port, preferably configured as an outwardly extending annular flange or collar. Preferably, said port is closely fitted to the outside diameter of the forward end of the rigid tube 2 for secure slidable mounting thereover. Preferably, a compression ring 6 is mounted over the outer annular surface of the annular flange or collar, such pressure ring 6 serving as an attaching means, compressively holding the elastic air bladder 4 upon the forward end of rigid tube 2. Compression ring 6 may alternately comprise a hose clamp, a magniform ring, a heat shrink ring, or a crimp ring. Alternately, means for attaching the elastic air bag 4 to the forward end of the rigid tube 2 may comprise a threaded fitting (not depicted) molded as an integral part of the elastic air bladder 4. Also, alternately and suitably, the attaching means may comprise an adhesively bonded joint or a friction joint. Also suitably, the attaching means may comprise wire frapping.

Figure 2:
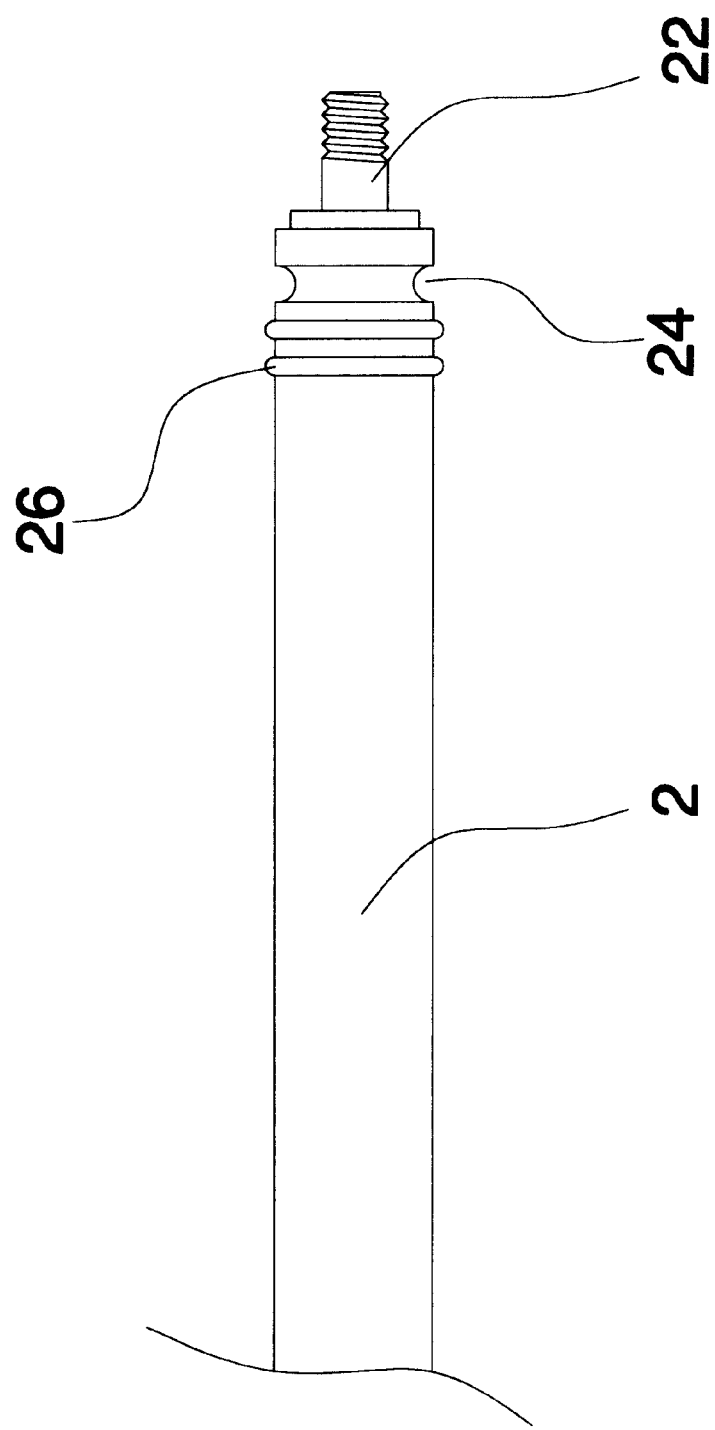
FIG. 2 is a detail of the valve tool depicted in FIG. 1, the detail showing air line attachment assembly removed.

Referring to FIG. 2, air flow control means, preferably in the form of a spring biased check valve 22 such as is commonly utilized upon pneumatic tires, is mounted inline with the rearward end of rigid tube 2. Alternate air flow control means which are utilizable in place of check valve 22 comprise a quarter turn ball valve (not depicted) or cylindrical plug valve (not depicted), such valve being operatively connected to the rigid tube 2. Preferably, air sealing O-rings 26 are mounted within channels upon the rearward end of rigid tube 2. Also preferably, a quick fastener ball receiving channel 24 is milled into the rearward end of rigid tube 2.

Referring again to FIG. 1, the inventive tool preferably, comprises an air line 10, the air line 10 extending rearwardly to a source of compressed air such as an air tank (not depicted), or an air compressor (not depicted). A quarter turn ball valve or cylindrical plug valve 12 having a manually operable turn handle 18 is preferably fixedly and removably attached to the distal end of air line 10 by means of a floating ball quick fastener 44. A spring biased ball pressure relief valve 14 having a pressure adjustment screw 20 is preferably fixedly mounted upon the output end of valve 12. Referring simultaneously to FIGS. 1 and 2, the interior floating balls (not depicted) of quick fastener 16 engage with channel 24 for quick and convenient attachment and detachment.

Figure 3:
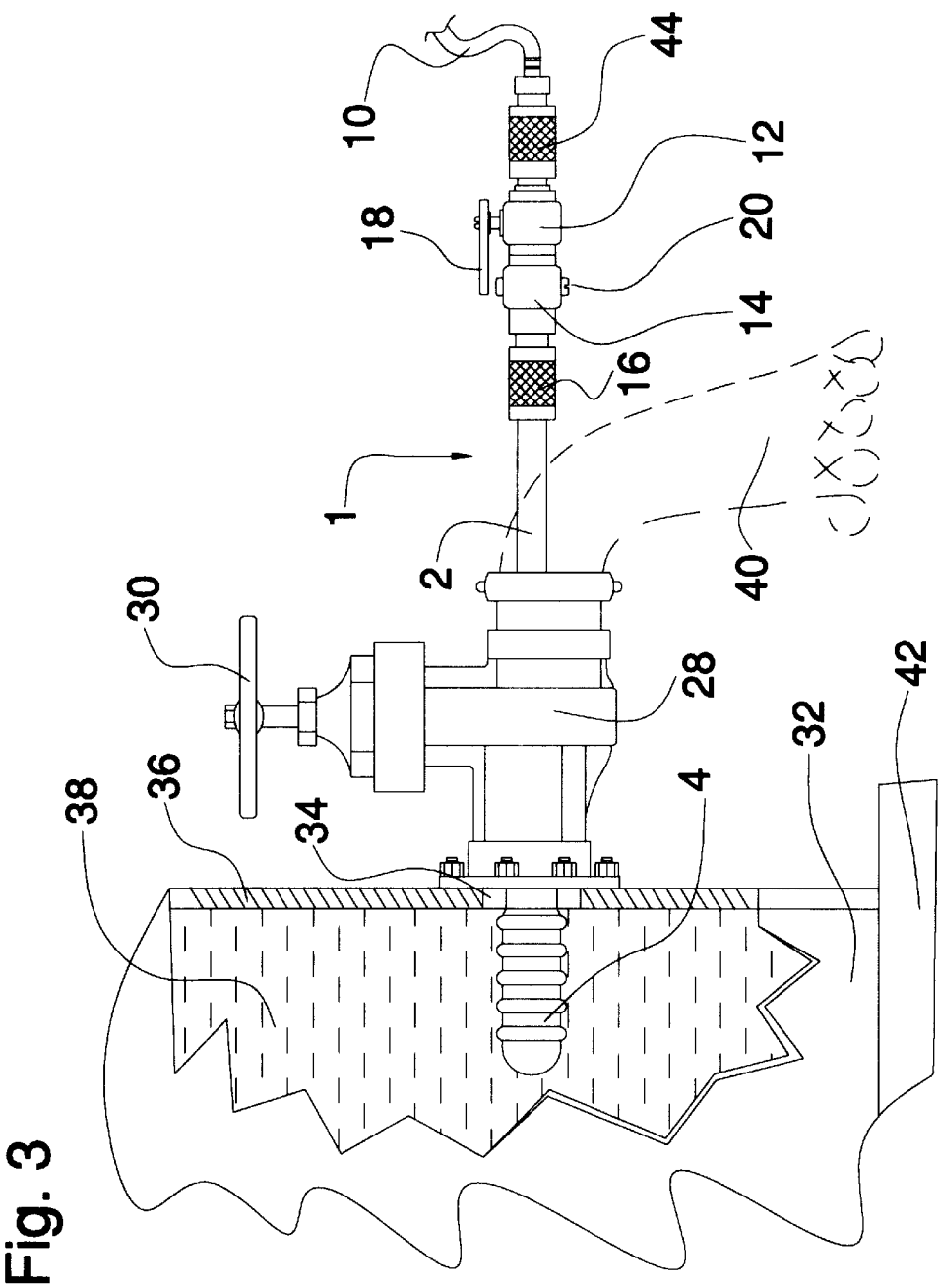
FIG. 3 depicts utilization of the inventive tool upon a gate valve attached to a fluid bearing tank.

Referring to FIG. 3, the inventive method wherein the inventive tool 1 is utilized may, if necessary, include initial steps of closing valve 28 and removing a pipe (not depicted from the downstream end of valve 28. Upon exposure of the downstream bore of valve 28, turn wheel 30 is rotated until its interior gate or other sealing member (not depicted) moves to its opened position. Upon opening of valve 28, oil 38 stored within oil storage tank 32 commences to flow out of output port 34 which extends through tank wall 36. Said oil then flows through the bore of valve 28 to emit as spillage 40 from the downstream end of gate valve 28. Preferably, a catch basin (not depicted) is placed at the base of support slab 42 for retention of such spillage 40.

Figure 4:
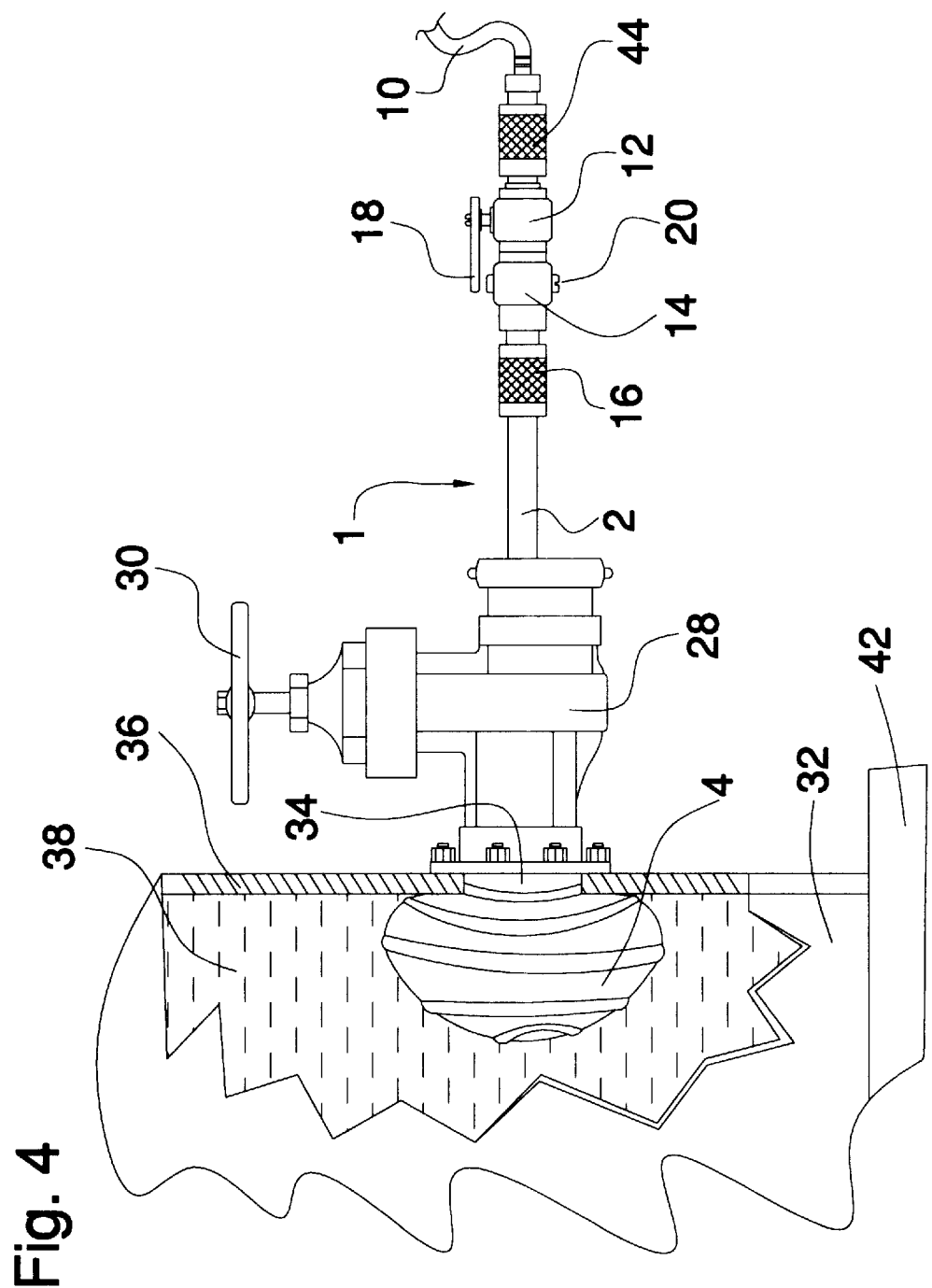
FIG. 4 redepicts the image of FIG. 3 showing valve tool in its inflated fluid flow sealing configuration.

Referring further to FIG. 3, upon insertion of tool 1 as depicted, turn handle 18 is turned one quarter turn allowing compressed air flowing forwardly through air line 10 to move forwardly through rigid tube 2, and thence into elastic air bladder 4. Referring to FIG. 4, such air flowing into elastic air bladder 4 causes such bladder to expand and to seal against the inner surface of tank wall 36 and against the annular inwardly facing edges of output port 34.

Referring simultaneously to FIGS. 3 and 4, upon such sealing action by bladder 4, the flow of spillage 40 ceases. Upon cessation of spillage, the slide collar of quick fastener 16 is slidably moved rearwardly, and the valve and fastener assembly attached to the distal end of air line 10 is withdrawn and set aside. Valve 28 may then be removed from tank wall 36 and withdrawn rearwardly over rigid tube 2. Valve 28 is then either repaired or replaced. The repaired or replaced valve is re-extended over rigid tube 2 for fixed reattachment over port 34.

Referring simultaneously to FIGS. 2, 3, and 4, upon reattachment or replacement of valve 28, the spring biased valve stem core (not depicted) of valve 22 is depressed forwardly, allowing air to escape rearwardly, and allowing elastic air bladder 4 to deflate to its original configuration as depicted in FIG. 3. Upon deflation of the elastic air bladder 4, its seal against tank wall 36 is broken, and tool 1 is immediately withdrawn rearwardly through the bore of valve 28. Valve 28 is then immediately closed through turning wheel 30.

Referring further to FIG. 3, where the upstream end of valve 28 is attached to a pipe (not depicted) rather than a tank, the outer surface of inflated elastic air bladder 4 seals against the annular inner surface of such pipe.

Referring further to FIG. 3, the annular outer surface of elastic air bladder 4 may be caused to seal against the annular inner surface of the upstream end of the bore of valve 28, instead of sealing against a structure to which such valve is attached. Such a seal may be utilized where in place maintenance or repair is to be performed upon the actuator assembly of valve 28, without removal of such valve.

The inventive method is applicable equally to any valve having a substantially linear bore from upstream end to downstream end, such as ball valves, cylindrical plug valves, butterfly valves, or full bore diaphragm valves.

While the principles of the invention have been made clear in the above illustrative embodiment, those skilled in the art may make modifications in the structure, arrangement, portions, components and method steps of the invention without departing from those principles. Accordingly, it is intended that the description and drawings be interpreted as illustrative and not in the limiting sense, and that the invention be given a scope commensurate with the appended claims.

We claim:

1. A method of repairing or replacing a fluid retaining valve, the fluid retaining valve having a downstream end, and upstream end, and having a hollow bore extending from the downstream end to the upstream end, the hollow bore of the fluid retaining valve having a diameter, the upstream end of the fluid retaining valve being attached to an output port of a fluid bearing tank or to an output end of a fluid bearing pipe, the method comprising steps of:

(a) providing a valve tool having lateral dimensions which are less than the diameter of the hollow bore of the fluid returning valve for complete passage of the valve tool through said hollow bore, the valve tool comprising a rigid tube having a rearward end, a forward end, and having a hollow bore which is capable of conveying air, the hollow bore of the rigid tube extending from the rearward end to the forward end; the valve tool further comprising an elastic air bladder having an expansible hollow interior space and having a port; the valve tool further comprising attaching means interconnecting the port and the forward end of the rigid tube; the valve tool further comprising air flow control means operatively connected to the rigid tube, the air flow control means being adapted for alternately and selectively permitting and resisting rearward air flow within said tube's hollow bore;

(b) opening the fluid retaining valve;

(c) extending the valve tool upstream through the hollow bore of the fluid retaining valve;

(d) injecting air into the rearward end of the rigid tube, causing the elastic air bladder to inflate and to seal against either the output port of the fluid bearing tank or the output end of the fluid bearing pipe;

(e) detaching and rearwardly withdrawing the fluid retaining valve over the rigid tube;

(f) repairing or replacing the fluid retaining valve;

(g) forwardly extending the repaired or replaced fluid retaining valve over the rigid tube;

(h) attaching the upstream end of the repaired or replaced fluid retaining valve to the output port of the fluid retaining tank or to the output end of the fluid bearing pipe;

(i) operating the air flow control means to permit rearward air flow within the hollow bore of the rigid tube, causing the elastic air bladder to deflate and to break said seal; and (j) withdrawing the valve tool from the hollow bore of the repaired or replaced fluid retaining valve.

2. The method of claim 1 further comprising a final step of closing the repaired or replaced fluid retaining valve.

* * * * *